US008737838B2

(12) United States Patent
Adlerstein

(10) Patent No.: US 8,737,838 B2
(45) Date of Patent: May 27, 2014

(54) EMBEDDED OPTICAL WAVEGUIDE FEED STRUCTURE FOR RADIO FREQUENCY ANTENNA ARRAYS

(75) Inventor: Michael G. Adlerstein, Wellesley, MA (US)

(73) Assignee: Raytheon Company, Waltham, MA (US)

( * ) Notice: Subject to any disclaimer, the term of this patent is extended or adjusted under 35 U.S.C. 154(b) by 608 days.

(21) Appl. No.: 12/971,211

(22) Filed: Dec. 17, 2010

(65) Prior Publication Data

US 2012/0154227 A1 Jun. 21, 2012

(51) Int. Cl.
*H04B 10/00* (2013.01)
*H04B 13/02* (2006.01)

(52) U.S. Cl.
USPC .......................................... 398/115; 398/116

(58) Field of Classification Search
USPC ................................................. 398/115–117
See application file for complete search history.

(56) References Cited

U.S. PATENT DOCUMENTS

| | | | | |
|---|---|---|---|---|
| 3,305,867 | A | 2/1967 | Miccioli et al. | |
| 5,307,073 | A * | 4/1994 | Riza | 342/372 |
| 2011/0032158 | A1 * | 2/2011 | Rodger et al. | 343/702 |

* cited by examiner

*Primary Examiner* — Daniel Dobson
(74) *Attorney, Agent, or Firm* — Daly, Crowley, Mofford & Durkee, LLP

(57) ABSTRACT

A feed structure for a radio frequency antenna, comprising: a plurality of radio frequency antenna elements; and a plurality of detectors, each one of the detectors being coupled to a corresponding one of the radio frequency antenna elements. Each one of the detectors is responsive to optical frequency energy to produce input radio frequency power for the corresponding one of the antenna elements coupled to said one of the detectors.

16 Claims, 3 Drawing Sheets

EMBEDDED OPTICAL WAVEGUIDE FEED STRUCTURE FOR RADIO FREQUENCY ANTENNA ARRAYS

TECHNICAL FIELD

This disclosure relates generally to radio frequency (RF) antenna arrays and more particularly to feed structures for such antenna arrays.

BACKGROUND

As is known in the art, feed structures are used to couple a radar or communication system to an array of antenna elements.

As is also known, one type of antenna is fabricated as a panel consisting of multiple elements to constitute a phased array. Such panels are typically flat or can be made to conform to curved surfaces. The RF elements in the panel must be synchronized in both frequency and phase to allow for beam steering in both transmit and receive modes. At each antenna element, frequency and phase must be adjustable to provide proper collimated and directed antenna beams. With present technology, a microwave network, known as a beamformer, is used as the feed network. Typically, such beamformers are binary split corporate feeds implemented in multi-layer circuit boards using embedded RF transmission line. The same boards also accommodate surface mounted microchips that further processing RF signals in both transmit and receive modes. For example, an embedded RF transmission feed panel is typically stripline with alternate layers of line and groundplane. As many as 23 layers comprise such a board in one example. Such panels having these layered metallic transmission lines must be very well aligned and must allow for through-vias. They are therefore relatively large in size and weight, as well as costly. Further, microwave losses and unwanted modes within the multilayer board complicate design and manufacture.

SUMMARY

In accordance with the present disclosure, a feed structure is provided for a radio frequency antenna, comprising: a plurality of radio frequency antenna elements; and a plurality of detectors, each one of the detectors being coupled to a corresponding one of the radio frequency antenna elements. Each one of the detectors is responsive to electromagnetic waves to generate radio frequency input power for the corresponding one of the antenna elements coupled to said one of the detectors.

In one embodiment, the detectors are fed a pair of optical signals having different frequencies.

In one embodiment, the difference in frequencies is related to the frequency of the radio frequency signal.

In one embodiment, the detectors are square law photodiodes, the difference in frequencies is the frequency of the radio frequency signal.

In one embodiment, the detectors are electric-field (voltage) driven transducers, and the radio frequency signal is one half of the difference in the frequencies of the optical frequency signals.

In one embodiment, the detectors are interconnected by an optical waveguide fed by an optical frequency signal.

In one embodiment, the difference in frequencies is related to the frequency of the radio frequency signal.

In one embodiment, the feed structure includes: a plurality optical coupler/detector sections, each optical coupler/detector section having an optical coupler and a detector; wherein the optical couplers are serially interconnected by an optical waveguide; wherein the optical waveguide is fed by the pair of optical frequency signals having different frequencies; and wherein the optical coupler passes a portion of optical energy fed to said one of the optical coupler/detector sections to a next serially coupled one of the optical coupler/detector sections and another portion to the detector in said one of the optical coupler/detector sections.

In one embodiment, the detectors are separated in length by a half wavelength relative to the generated radio frequency energy.

In one embodiment, the antenna elements and the detectors are supported on a panel.

In one embodiment, the feed structure includes a variable attenuator/variable phase shifter section coupled between each one of the detectors and the coupled one of the antenna elements.

In one embodiment, the antenna elements and the detectors and the variable attenuator/variable phase shifter sections are supported on the panel.

In one embodiment, the optical frequency signal is modulated in accordance with control signals for the variable attenuator/variable phase shifter sections.

In one embodiment, the optical frequency signals are encoded or modulated with data or waveforms to be radiated at RF frequency by the antenna elements.

With such an arrangement, a microwave beamforming network is replaced with an optical waveguide (i.e., optical transmission line, herein referred to as a fiber or fiber optic cable, it being also noted that optical frequency signals refers to both light and infrared frequencies) embedded in the circuit board (i.e., panel). The fiber provides the RF reference signal by means of the light propagating through the fiber. At each element or subarray, light is coupled out of the optical fiber and detected and converted into an Rf signal for use by the antenna element array electronics.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
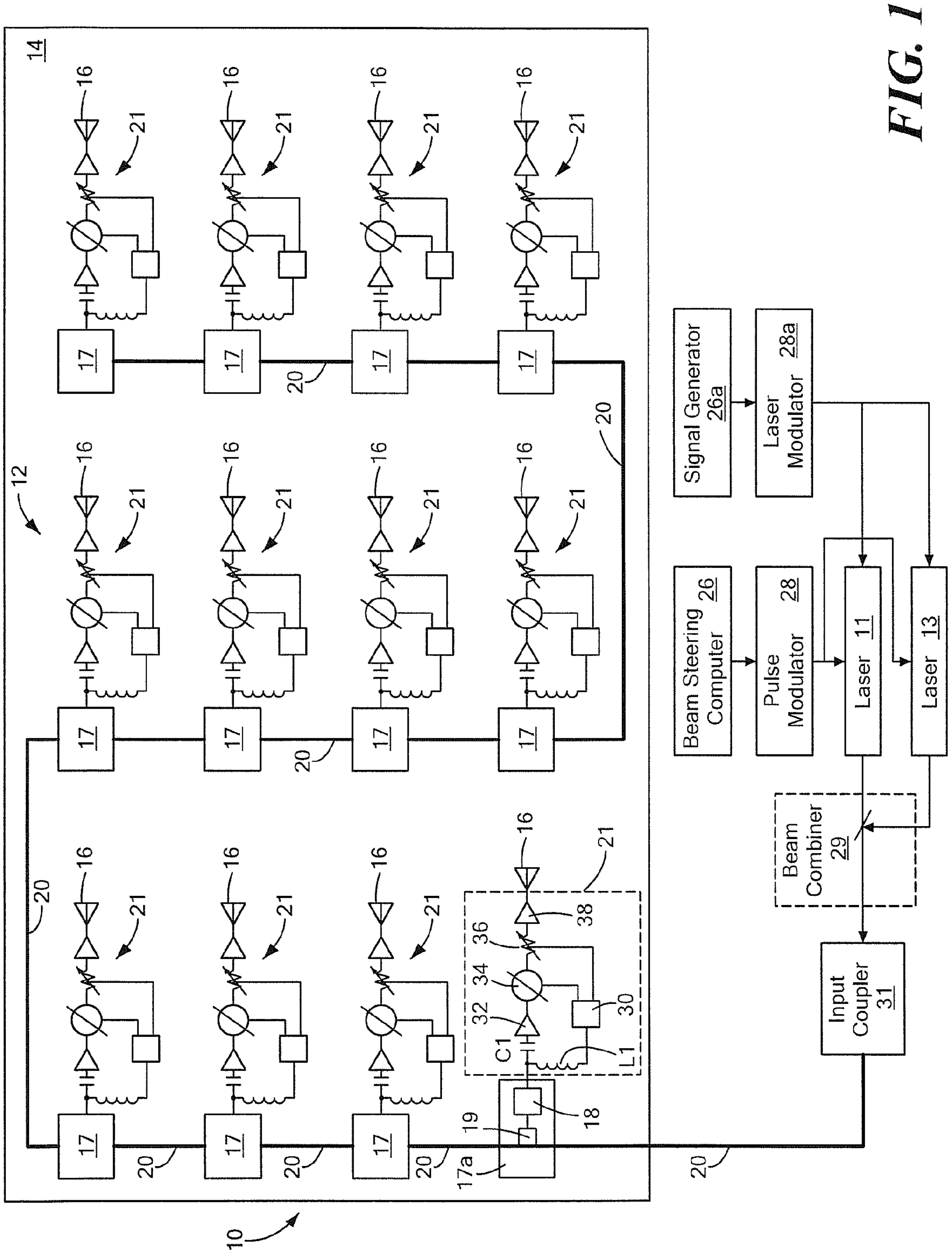
FIG. 1 is a diagram of a transmit phased array antenna system according to the disclosure.

Referring now to FIG. 1, a transmit phased array antenna system 10 is shown having a feed structure 12. The feed structure includes a panel 14, here for example a printed circuit board or a semiconductor substrate, for example GaAs, supporting a plurality of radio frequency antenna elements 16 and a plurality of optical coupler/detector sections 17. Each one of the optical coupler/detector sections 17 is identical in construction, an exemplary one thereof, here the optical coupler/detector sections 17; one of the optical coupler/detector sections 17, here labeled 17*a* being shown in detail to include an optical coupler 19 for picking off a fractional portion of optical signals passing through an optical waveguide 20, and a detector 18 arranged as shown. Each one of the detectors 18 is coupled to a corresponding one of the radio frequency antenna elements 16 through a variable attenuator/phase shifter section 22. Each one of the detectors 18 is responsive to optical frequency energy to produce radio frequency energy for the corresponding one of the antenna elements 16 coupled to said one of the detectors 18.

Here, for example, the detectors 18 are fed by a pair of optical signals on the waveguide 20 having different frequencies. The difference in frequencies is related to the frequency of the radio frequency signal. The frequency relationship depends on the type of detector 19 used. For example, if an electric-field probe detector is used adjacent to the fiber then one half of the difference frequency between the optical signals is the frequency of the radio frequency signal. If a square-law (intensity) photodetector is used, then the frequency of the radio frequency signal is equal to the difference between the optical frequencies.

More particularly, the optical coupler/detector sections 17 each act on light extracted from the optical waveguide 20, for example a fiber optical cable 20. The fiber optic cable 20 is fed by the pair of optical frequency signals produced by lasers 11 and 13, such lasers 11, 13 having different frequencies. More particularly, the outputs of the lasers 11, 13 are combined into a composite beam by a beam combiner 29, such composite beam having the pair of different frequencies; the composite beam being fed into the optical cable 20 by any suitable input coupler 31, as indicated.

The couplers 19 are separated by a half the free space wavelength of the radio frequency signal. Thus, the feed structure 12 includes: a plurality of optical coupler/detector sections 17, each optical coupler/detector section 17 having a optical coupler 19 (i.e., a fiber optic coupler) and one of the detectors 18. The optical couplers 19 are interconnected by the fiber optical cable 20. The fiber optic cable 20 is fed by the pair of optical frequency signals having different frequencies. The optical coupler 19 passes a portion of optical energy fed to said one of the coupler/detector sections 17 to a next serially coupled one of the optical coupler/detector sections 17 and another portion to the detector 19 in said one of the optical coupler/detector sections 17.

The fiber optic cable 20 may be supported on the panel 14 or drilled, either mechanically or chemically, in the panel 14 or be fabricated by photolithograph-chemical etching a channel in the panel 14. Further, the electronics may be fabricated in the panel where the panel is a semiconductor using monolithic microwave integrated circuits (MMIC) processing.

The feed structure 10 includes a variable attenuator/variable phase shifter section 22 coupled between each one of the detectors 18 and the coupled one of the antenna elements 16 also supported on the panel 14. The optical frequency signal is modulated in accordance with control signals to command settings of the variable attenuator/variable phase shifter sections 22.

More particularly, the phased array antenna system 10 includes a beam steering computer 26 which computes the phase shift and attenuation required to produce a collimated and directed beam of radio frequency energy from the antenna elements 16. The digital data produced by the beam steering computer 26 is fed to a pulse modulator 28 which converts the data from the computer 26 into pulses representative of a series of digital words, each digital word having the address of one of the variable attenuator/variable phase shifter sections 22 and the desired phase shift and attenuation for that addressed section 22.

The system 10 also includes an RF signal generator 26*a* which provides an RF waveform which is fed to a laser modulator 28*a*. The laser modulator 28*a* provides information or data to be modulated onto the transmitted RF signal. More particularly, the laser modulator 28*a* modulates the amplitude and/or optical frequency of one or more of lasers 11, 13. It is noted that the data rate from the pulse modulator 28 is on the order of one MHz while the information data rate from the laser modulator 28*a* is typically in the order of several hundred MHz, A diplexer network 21 having a capacitor C1 in series between the detector 18 and a buffer amplifier 32 and an inductor L1 in series between the detector 18 and an addressable pulse detector 30 is used to separate relatively low speed control signals (associated with pulse modulator 28 and hence beam steering computer 26) from the higher speed RF signal recovered from the light detector 10.

The fiber optic cable 20 (or any other optical waveguide) may be fabricated in the panel or be supported by the panel. On transmit, the fiber optic cable is fed to provide optical energy to the optical coupler/detector sections 17, as indicated. As noted above, each one of the optical coupler/detector sections 17 includes an optical coupler or fiber optic coupler 19 which directs one portion of the optical energy entering the optical coupler 19 through it toward the following optical coupler/detector sections 17 (more particularly to the optical coupler 19 in the very next optical coupler/detector sections 17 along the fiber optic cable 20) while another portion is coupled to the detector 18, as indicated. The detector 18, acting as a low pass filter, thus extracts from the two optical frequencies a beat frequency signal, i.e., an RF signal having a frequency proportional to the difference between the frequencies of the two optical frequency signals striking the detector 18. In one embodiment, such extracted frequency is the frequency of the radio frequency signal to be transmitted by the antenna elements 16.

The output of the detector 18 is ac coupled to the RF path of the variable attenuator/variable phase shifter section 22 and dc coupled to a command-decoding addressable pulse detector 30 (for beam steering), as indicated. More particularly, the variable attenuator/variable phase shifter section 22 includes a buffer amplifier 32, followed by a variable phase shifter 34 and attenuator 36, followed by an RF power amplifier 38 that feed the antenna element 16. The addressable pulse detector 30 provides the control signals for the variable phase shifter 34 and attenuator 36, as indicated.

Thus, the feed structure 12 is here a single serpentine fiber structure carrying two light beams, on a common fiber optical cable 20 entering from the same optical port and propagating in the same direction. A portion of this light is coupled out at each coupler 19. Consider that these two beams are respectively raised and lowered in angular frequency, by δω. Then at any given point along the fiber, the net light electric field is given by $$A(x,t) := \cos[(k\cdot x-\omega\cdot t)-(\delta k\cdot x-\delta\omega\cdot t-\phi)]+\cos[(k\cdot x-\omega\cdot t)+(\delta k\cdot x-\delta\omega\cdot t-\phi)] \quad \text{Equation 1a}$$

where, $\delta k=\delta\omega/c$ is the magnitude of the change in propagation constant, where c is the speed of light and where $\phi/2$ is an arbitrary phase offset between the beams. By expanding Equation 1a, we obtain for the electric field $$A(x,t) := 2\cdot\cos(\delta k\cdot x-t\cdot\delta\omega-\phi)\cdot\cos(k\cdot x-\omega\cdot t) \quad \text{Equation 1b}$$

Figure 2:
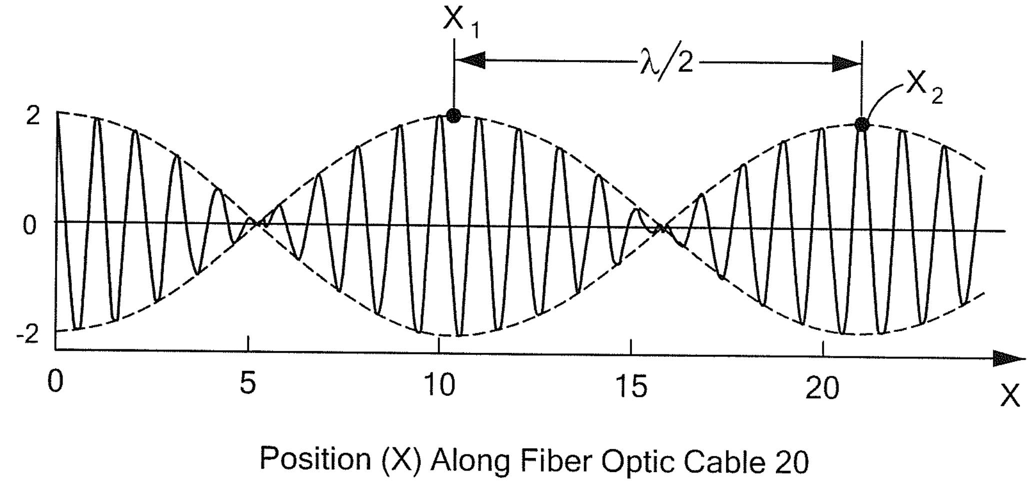
FIG. 2 is a snapshot in time of the Electric Field along a Fiber used in the system of FIG. 1.

A(x,t) represents a phase and amplitude modulated light wave conforming to a generally propagating envelope function as shown in FIG. 2. If $\delta\omega/2\pi$ is a microwave frequency, then the envelope can represent the desired reference signal for the array of microwave elements.

Referring to FIG. 2, a snapshot of the Optical Field along the fiber optic cable 20 as described by Equation 1b is shown. As seen by an external observer, the peaks and valleys travel along the fiber optic cable 20. As seen at a fixed point, say point X1, along the fiber optic cable 20, there will be sinusoidal variation at an RF frequency of the electric field averaged over many optical cycles. Multiple points (couplers 19), periodically placed along the fiber optic cable 20, will be synchronized in frequency, amplitude and phase. To use this reference, the detector 18 is a radio frequency (RF) coupler in proximity to the optical fiber and is used to detect the time average electric field. The average is taken over many optical cycles but preserves variation at the RF frequency. Such a detector 18 will develop a time varying voltage that is proportional to the envelope function in amplitude. For maximum scan angle, phased array elements are spaced by $\lambda/2$, where $\lambda$ is the free space microwave wavelength. Furthermore, for use as an RF reference signal with identical array elements, it is desired that the envelope signal be independent of element position. The second condition follows naturally from the first since for the envelope function, $$\delta k \delta x = (\delta\omega/c)\lambda/2 = \pi \qquad \text{Equation 2}$$

Equation 2 shows that sequential array of elements 16 along the fiber optic cable 20 will have envelope functions differing only by a sign change on the optical sine wave peaks. Such a sign change could be compensated in subsequent element electronics within the phase shifter/attenuation section 22 coupled to the antenna element 16. The envelope is then a standing wave in the fiber throughout the feed network 12. The output at each detector 18 is at frequency $\delta\omega/2\pi$ and are identical in frequency, magnitude and phase. Based on this reference signal, further amplitude tuning and phase shifting can be implemented by the electronics commonly incorporated in a phased array element. (i.e., the variable attenuator/variable phase shifter section 22). Attenuation of light along the fiber optic cable 20 may be mitigated by the element electronics in the variable attenuator/variable phase shifter section 22. For example, the post-detector buffer amplifier 32 could be a saturated amplifier. Thus its output voltage will be independent of the detected power over the range available at the fiber optic coupler per antenna element 16.

Figure 2A:
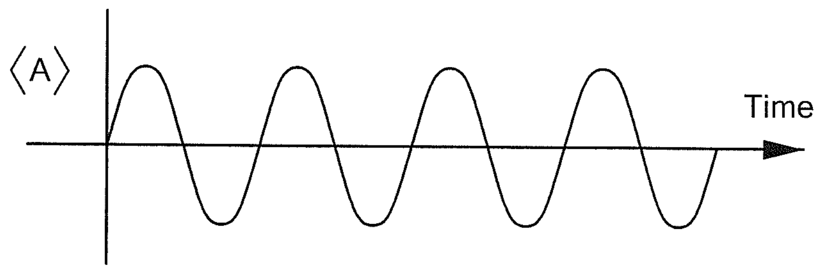
FIG. 2A is a time history of the averaged electric field amplitude (<A>) at a point X along the fiber of FIG. 2.

The detectors 18 are placed where there is a maximum variation of electric field, i.e., at points X1, X2, etc, in FIG. 2. As shown in FIG. 2A, the averaged electric field amplitude (<A>) at point X1, X2 etc. will vary sinusoidal at the beat frequency. Further, the next photodetector beyond point X1 will be at point X2, and point X1 will be one half wavelength $\lambda$ (i.e., $\lambda/2$) from point X1.

In another embodiment of the dual optical beam reference approach, detector 18 is a square-law optical detector rather than an electric-field probe. Typically, a light intensity detector will act as a square-law rectifier. In that case, the average over many optical cycles of the square of A(x,t) in Equation 1b represents the detector output. Such output will yield a recoverable RF modulation envelope as results from a standing light intensity wave. Again, peaks in the standing wave modulation coincide with optimally placed positions of the array elements.

$$A(x,t)^2 = 2\cdot\cos(k\cdot x-\omega\cdot t)^2\cdot(\cos(2\cdot\delta\omega\cdot t-2\cdot\delta k\cdot x+2\cdot\phi)+1) \qquad \text{Equation 3}$$

In another embodiment, as described in FIG. 1, light on the fiber optic cable 20 can be digitally encoded to provide control and other information to individual or ensembles of elements (e.g. the variable phase shifter/attenuator sections 22, as described above).

Figure 3:
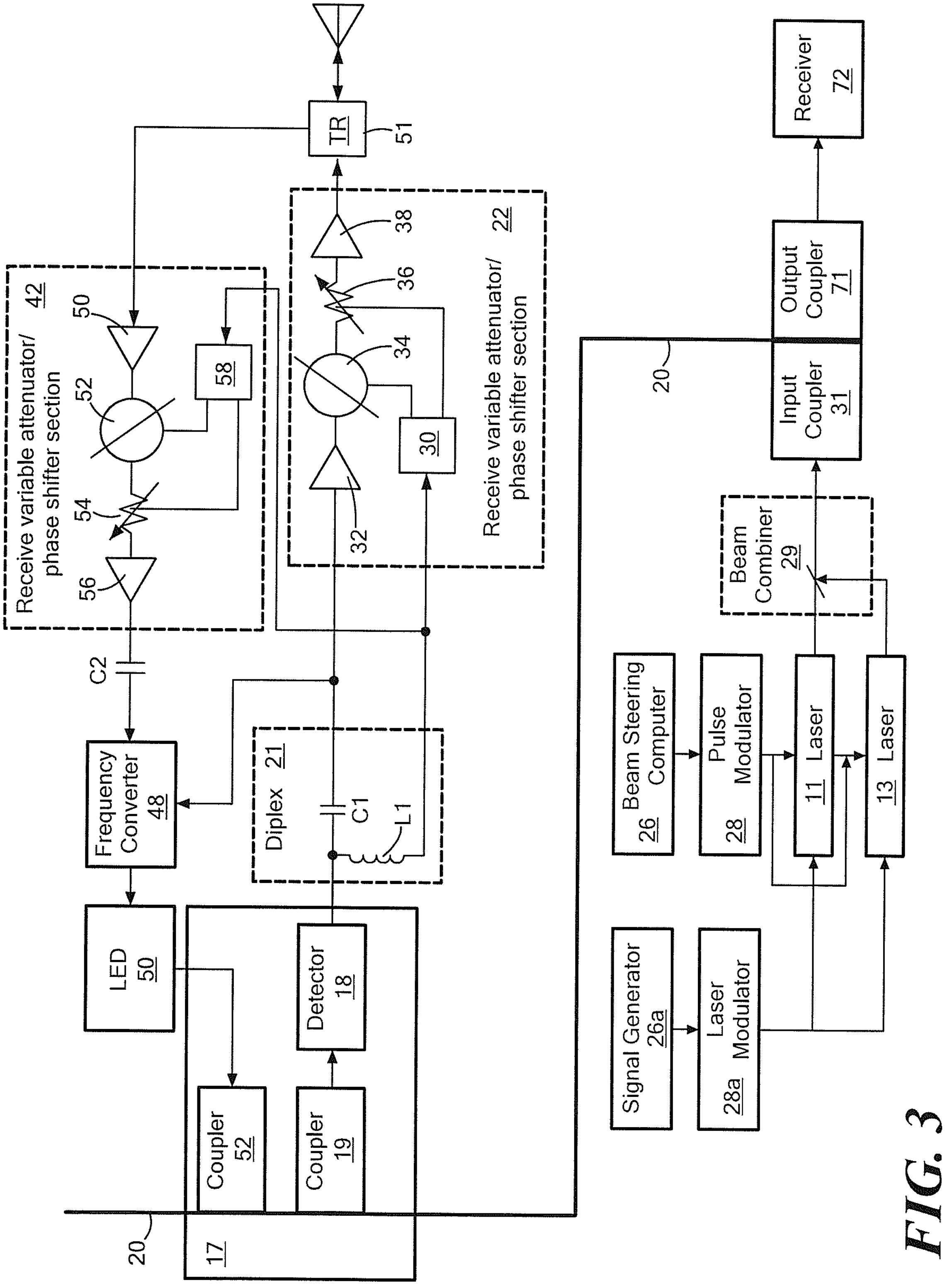
FIG. 3 is a diagram of a variable attenuator/variable phase shifter section adapted to use optical waveguide in a feed network for the phased array antenna of FIG. 1, such feed network being adapted for both transmit and receive modes of operation.

Another embodiment that relates to the receive function is shown in FIG. 3. Here the array elements 16 are coupled to light sources such as a laser or the Light Emitting Diode (LED) 50. Such light sources return RF modulated light, to the optical fiber cable 20. Thus, here, the fiber optic cable 20 is a bi-directional fiber optical cable or optical waveguide. Such signals may contain data, waveforms or modulation impressed by the RF receiver. The differential RF amplitude and phase between the outputs of different elements are set by the variable phase shifter/attenuator section 42. The variable phase shifter/attenuator section 42 includes: an amplifier 50 fed by the antenna element 16 through a transmit/receive (T/R) switch 51 or circulator; a variable phase shifter 52 fed by the amplifier 50; a variable attenuator 54 fed by the phase shifter 52; an output amplifier 56, as indicated; and 58.

The variable phase shifter/attenuator section 42 is ac coupled through capacitor C2 to the light emitting diode 50. Beam steering control signals for the variable phase shifter 52 and variable attenuator 54 are produced by an addressable pulse detector 58 in response to the low data rate signal passed by the inductor L1 of the diplexer 21 in a manner similar to the control signals produced by addressable pulse detector 30.

The light emitting diode 50 produces an optical frequency beam, which is fed by a fiber optic coupler 52 and the fiber optic cable 20, to a receiver 70 via an output coupler 71. Here the LED 50 produces light at a wavelength that passes through the optical coupler 71 to the receiver 70 and not to lasers 11, 13; it being noted that the optical energy produced by the lasers 11, 13 is prevented from the optical coupler 71 from passing to the receiver 70 by, for example, using an optical filter. It is noted that the LED 50 output light may be carried by a separate fiber optic cable positioned adjacent to the fiber optic cable 20 which carrys the laser energy.

The modulated light impressed on the fiber optic cable by each intra-element light source will be in accordance with the amplitude and phase of the signal impressed by the receive variable phase shifter/attenuator section 42. This coherence is to preserve the directionality of the RF antenna pattern. To conform to the frequency response limitations of the LED 50, a frequency down-conversion circuit 48 is here for example, in this embodiment, included, as shown. As shown in FIG. 3, an RF local oscillator signal could be extracted from the fiber optic cable 20 in a manner similar to that used in the transmit Mode, here for example, from the capacitor C1 of diplexer 21, as indicated. Because of the light source 50 placement along the fiber optic cable 20, light from each array element 16 would be coherently coupled into the fiber 50. The coherence would be at the RF frequency of the antenna array. This feature, along with, the settings of the phase shifters 52 and attenuators 54 in said RF receive variable phase shifter/attenuator section 42 results in a sharply pointed RF receive beam pattern detected in the receiver 70 as noted above. Thus, as described above, the settings of phase shifters 52 and attenuators 54 to establish the pointing directions of the receive beam might be established in a manner similar to that used in the transmit function: phase shifter and attenuator setting commands would be encoded on an optical beam transmitted vie the fiber optic cable 20 from the beam steering computer 26. By so doing, the RF pattern on receive can be established. It is noted that control signal, not shown, for the TR switch 51, amplifiers 50, 56, 32 and 38 may be produced at the output of pulse detectors 30 and 58 in response to signals produced by the beam system computer 26 and fed to pulse detectors 30 and 58 via pulse modulator 28 and cable 20.

Thus the disclosure presents systems that use Optical waveguide such as fiber optic cable to carry light to the elements of an RF phased array. The waveguide is embedded in or supported by the same supporting structure as used for the RF antenna elements. The elements include means of detecting any light signals in the waveguide. Modulated light may be placed on or taken off of the optical waveguide at the array elements. The disclosed structure results in a Photonic Interface which has the potential to reduce size, weight and cost of panel phased arrays while improving functionality.

A number of embodiments of the disclosure have been described. Nevertheless, it will be understood that various modifications may be made without departing from the spirit and scope of the disclosure. For example, while a pair of optical beams is described, a single, modulated, optical beam may be used. Further, the wavelength of light from LED 50 may or may not be different from that emitted from lasers 11 or 15. Still further the optical waveguide may be a continuous waveguide traversing the entire antenna feed structure or a segmented waveguide having multiple input and output ports.

Accordingly, other embodiments are within the scope of the following claims.

What is claimed is:

1. A feed structure for a radio frequency antenna, comprising:

a plurality of radio frequency antenna elements;

a plurality of detectors, each one of the detectors being coupled to a corresponding one of the radio frequency antenna elements; and wherein each one of the detectors is responsive to optical frequency energy to produce input radio frequency power for the corresponding one of the antenna elements coupled to said one of the detectors; and wherein the feed structure includes: a plurality optical coupler/detector sections, each one of the coupler/detector sections section having an optical coupler and a detector; wherein the optical couplers are serially interconnected by an optical waveguide; wherein the optical waveguide is fed by the pair of optical frequency signals having different frequencies; and wherein the optical coupler passes a portion of optical energy fed to said one of the optical coupler/detector sections to a next serially coupled one of the optical coupler/detector sections and another portion to a photodetector in said one of the optical coupler/detector sections.

2. The feed structure recited in claim 1 wherein the difference in frequencies is related to the frequency of the radio frequency signal.

3. The feed structure recited in claim 2 where the detectors are separated in length by half the radio frequency wavelength.

4. The feed structure recited in claim 2 wherein the antenna elements and the detectors are supported on a panel.

5. The feed structure recited in claim 4 including a variable attenuator/variable phase shifter section coupled between the each one of the detectors and the coupled one of the antenna elements.

6. The feed structure recited in claim 5 wherein the optical frequency signal is modulated in accordance control signals for the variable attenuator/variable phase shifter sections.

7. The feed structure recited in claim 6 wherein the variable attenuator/variable phase shifter sections are supported on the panel.

8. The feed structure recited in claim 4 wherein the difference in frequencies is proportional to the frequency of the radio frequency signal.

9. The feed structure recited in claim 8 wherein the detectors are interconnected by an optical waveguide fed by a pair of optical frequency signals having different frequencies and wherein such panel supports the optical waveguide.

10. The feed structure recited in claim 9 where the optical waveguide is a continuous waveguide traversing the entire antenna.

11. The feed structure recited in claim 9 where the optical waveguide is a segmented waveguide having multiple input and output ports.

12. The feed structure recited in claim 2 including a panel and wherein the antenna elements and the detectors are supported on the panel.

13. The feed structure recited in claim 12 including a variable attenuator/variable phase shifter section coupled between the each one of the detectors and the coupled one of the antenna elements.

14. The feed structure recited in claim 13 wherein the optical frequency signal is modulated in accordance with control signals for the variable attenuator/variable phase shifter sections.

15. The feed structure recited in claim 14 wherein the variable attenuator/variable phase shifter sections are supported on the panel.

16. The feed structure recited in claim 1 wherein the antenna elements and the detectors are supported on a panel.

* * * * *